United States Patent [19]
Lallier

[11] Patent Number: 5,990,063
[45] Date of Patent: Nov. 23, 1999

[54] STRIPPING COMPOSITION BASED ON WATER AND ANISOLE

[75] Inventor: Jean-Pierre Lallier, Courbevoie, France

[73] Assignee: Elf Atochem S.A., Puteaux, France

[21] Appl. No.: 08/866,054

[22] Filed: May 30, 1997

[30] Foreign Application Priority Data

May 31, 1996 [FR] France ................................ 96 06736

[51] Int. Cl.⁶ ........................... C11D 3/20; C11D 7/50; C09D 9/00
[52] U.S. Cl. ..................... 510/206; 510/203; 510/417; 134/38
[58] Field of Search .................. 510/202, 203, 510/206, 212, 417; 134/38

[56] References Cited

U.S. PATENT DOCUMENTS

| | | | |
|---|---|---|---|
| 4,171,240 | 10/1979 | Wong | 156/630 |
| 4,518,518 | 5/1985 | Koch | 252/142 |
| 4,591,391 | 5/1986 | Shimizu et al. | 134/22.17 |
| 4,623,611 | 11/1986 | West | 430/329 |
| 4,854,973 | 8/1989 | Holdar | 134/39 |
| 4,956,115 | 9/1990 | Van De Mark | 252/170 |
| 4,992,187 | 2/1991 | Adams et al. | 252/50 |
| 5,011,621 | 4/1991 | Sullivan | 252/162 |
| 5,128,230 | 7/1992 | Templeton et al. | 430/191 |
| 5,155,011 | 10/1992 | Zertani et al. | 430/331 |
| 5,155,012 | 10/1992 | Joerg et al. | 430/331 |
| 5,232,515 | 8/1993 | Sullivan | 134/38 |
| 5,308,527 | 5/1994 | Lallier et al. | 252/162 |
| 5,468,422 | 11/1995 | Khouzam et al. | 252/544 |
| 5,484,952 | 1/1996 | Nolan et al. | 549/329 |

FOREIGN PATENT DOCUMENTS

| | | |
|---|---|---|
| 0 573 339 | 12/1993 | European Pat. Off. . |
| 93/07227 | 4/1993 | WIPO . |

OTHER PUBLICATIONS

Journal of Pharmacy and Pharmacology, vol. 21, 1969, 70S–90S, 1969.
Journal of Physical Chemistry, vol. 93, 1989, 4855–4861, 1989.
Mellan, Ibert, Industrial Solvents Handbook, 2d ed., Noyes Data Corporation, pp. 338, 341, and 342, Month not known 1977.
Hansen, Charles M., "The Three Dimensional Solubility Parameter—Key to Paint Component Affinities: I", Journal of Paint Technology, 505(39), 104–117, Feb. 1967.
Hansen, Charles M., "The Three Dimensional Solubility Parameter—Key to Paint Component Affinities: II", Journal of Paint Technology, 511(39), 505–510, Aug. 1967.
Hansen, Charles M., et al., "The Three Dimensional Solubility Parameter—Key to Paint Component Affinities: III", 511(39), 511–514, Aug. 1967.
Kirk–Othmer, Encyclopedia of Chemical Technology, 2d ed., Supp. vol., pp. 889–910, month not known 1971.

*Primary Examiner*—Yogendra Gupta
*Assistant Examiner*—Gregory E. Webb
*Attorney, Agent, or Firm*—Millen, White, Zelano & Branigan, P.C.

[57] ABSTRACT

The present invention is related to a stripping composition for paints, varnishes or lacquers. This composition contains at least water and anisole.

12 Claims, No Drawings

STRIPPING COMPOSITION BASED ON WATER AND ANISOLE

CROSS-REFERENCE TO RELATED APPLICATION

This application is related to Applicants' co-pending application Ser. No. 08/866,052 filed May 30, 1997, based on French application No. 96/06735 filed May 31, 1996, and assigned to the same Assignee as the present application.

BACKGROUND OF THE INVENTION

The present invention is related to a stripping composition for paints, varnishes or lacquers covering a substrate.

Strippers for paints and varnishes or lacquers are employed in two ways: by deposition or by immersion. The strippers applied by deposition are generally applied by brushing or spraying. They virtually always contain a thickener and are employed at ambient temperature (20° C.). They are employed for small tasks or for objects to be stripped which cannot be immersed. This category includes stripping by the general public, professional stripping in the building trade and aeronautic stripping. The strippers by immersion employ either cold baths (often based on methylene chloride) or hot baths (often based on caustic soda). They are employed above all for stripping a large number of small articles (industrial stripping).

A stripping composition including, by volume, from 1 to 20% of a polar aprotic solvent such as dimethyl sulphoxide (DMSO) or N-methylpyrrolidinone (NMP) and from 99 to 80% of an ether such as tetrahydrofuran is already known from EP 0 490 726.

A stripping composition including, by volume, from 1 to 20% of a polar aprotic solvent like DMSO and NMP and from 99 to 80% of an ether exhibiting a flash point higher than 0° C., a molar volume smaller than 160 and a molecule provided with one or more methoxy groups is already known from EP 0573 339. This ether may be especially anisole.

Although highly effective in their stripping action, these two above stripping compositions nevertheless have the disadvantage of being costly.

Furthermore, WO 93/07227 discloses the addition of water to solvents or mixtures of solvents considered to be effective in paint stripping. This document describes compositions containing 1) at least one organic solvent chosen from ethyl acetate, methyl ethyl ketone and toluene, 2) water, 3) at least one thickener and 4) at least one surfactant.

The effectiveness of these compositions is simply proportional to the quantity of organic solvent which is employed and, in any case, inferior to the effectiveness of the pure solvent.

In the stripper industry there is thus a need to find other compositions which are lower in cost but which are at least as effective as the compositions of the prior art.

SUMMARY OF THE INVENTION

It has now been found that aqueous compositions of the water-anisole type have a paint-stripping effectiveness which is higher than that of anisole employed without water.

More precisely, the present invention lies in a stripping composition for paints, varnishes or lacquers, characterized in that it comprises at least the following two constituents:
1) water,
2) anisole.

This invention can be employed in the various sectors of paint stripping:
  general public stripping,
  professional stripping in building,
  industrial stripping,
  aeronautical stripping.

The constituents are advantageously present in the following proportions:
  1) water from 10 to 90 parts by weight,
  2) anisole from 10 to 90 parts by weight.

The constituents are preferably present in the following proportions:
  1) water from 70 to 80 parts by weight,
  2) anisole from 20 to 30 parts by weight.

The composition according to the invention preferably contains one or a number of other constituents chosen from an activator, a thickener and a corrosion inhibitor.

The activator may be, for example, chosen from monoethanolamine, aqueous ammonia at a concentration of 30% in water, and formic acid.

The thickener may be, for example, a cellulose-based or polyacrylic compound.

The corrosion inhibitor may be, for example, sodium benzoate.

In addition to the above description, the invention will be understood better with the aid of the following examples.

In all these examples, unless indicated otherwise, the content of each constituent of the compositions is shown as percentage by weight based on the total weight of the composition.

EXAMPLE 1

Water-Anisole Binary

Paints of the motor vehicle industry were employed as exemplifications of the compositions used in the industrial sector. The paints are Herberts Glacier White 389 polyester lacquers supplied by the Etalon company (France). The coating thickness is 35 to 45 µm. The metal panels employed are made of phosphated steel and have a rectangular covered surface of 90×190 mm. The performance on these panels can be generalized to other paints which are easier to strip than polyester paints, which is generally the case with glycerophthalics, alkyds and acrylics. The results appear in the following Table I:

TABLE I

| Compositions[1] | Stripping time[2] (seconds) |
| --- | --- |
| water/anisole (0/100)* | 410 |
| water/anisole (25/75) | 284 |
| water/anisole (50/50) | 264 |
| water/anisole (75/25) | 245 |
| water/anisole (100/0)* | no stripping |

[1]The compositions are homogenized in the form of emulsions.
[2]Obtained by impregnation of a piece of cotton wool at a temperature of 20° C.
*Comparative tests.

EXAMPLE 2

Microemulsions

The panels, the paints and their deposition are identical with those of Example 1. The water-anisole compositions can be formulated as thickened emulsions or as thickened microemulsions. The following formulation was prepared, the constituents being in quantities defined in parts by weight:

| | |
|---|---|
| water | 50.6 |
| anisole | 17 |
| diacetone alcohol | 18 |
| Sunaptol 16 | 7 |
| sodium dodecyl sulphate | 7 |
| Methocell | 2 |

The diacetone alcohol makes it easier to obtain a microemulsion as well as the mixture of Sunaptol 16 (surfactant ethoxylated with 16 ethylene oxides, marketed by ICI) and of dodecyl sulphate, another surfactant. Methocell is the thickener.

This formulation has been found to be as effective, owing to its stripping time of 500 seconds at 20° C., as a comparative dimethyl sulphoxide/anisole/Methocell mixture (30/70/2 parts by weight) in the same panel stripping test reported in Example 1.

EXAMPLE 3

Emulsions

The following formulation was prepared by employing Metox 15 OE (Metiloil ethoxylated with 15 ethylene oxide units, marketed by Elf Atochem), the constituents being in quantities defined in parts by weight:

| | |
|---|---|
| water | 50 |
| anisole | 47.5 |
| Metox 15 OE | 2.5 |

The performance values obtained at 20° C. are identical with those obtained with the microemulsion prepared without Methocell, but otherwise with the same quantities of constituents as Example 2, that is a stripping time of 600 seconds.

The preceding examples can be repeated with similar success by substituting the generically or specifically described reactants and/or operating conditions of this invention for those used in the preceding examples.

The entire disclosure of all applications, patents and publications, cited above, and of corresponding French application 96/06736, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

I claim:

1. A stripping composition for paints, varnishes or lacquers, containing the following two constituents homogenized to an emulsion in the absence of an emulsifying agent:
   1) water,
   2) anisole, in relative proportions affording a higher degree of stripping effectiveness than anisole alone.

2. A composition according to claim 1, further comprising at least one other constituent selected from a group consisting of an activator, a thickener and a corrosion inhibitor.

3. A composition according to claim 2, further comprising at least one other constituent selected from a group consisting of an activator, a thickener and a corrosion inhibitor.

4. A composition according to claim 3, further comprising at least one other constituent selected from a group consisting of an activator, a thickener and a corrosion inhibitor.

5. A composition according to claim 1, wherein the constituents are present in the following proportions:
   1) water from 10 to 90 parts by weight,
   2) anisole from 10 to 90 parts by weight.

6. A composition according to claim 1, wherein the constituents are present in the following proportions:
   1) water from 70 to 80 parts by weight,
   2) anisole from 20 to 30 parts by weight.

7. In a method of stripping paints, varnishes or lacquers, comprising applying a stripping composition to an object to be stripped, the improvement wherein the stripping composition is in accordance with claim 1.

8. In a method of stripping paints, varnishes or lacquers, comprising applying a stripping composition to an object to be stripped, the improvement wherein the stripping composition is in accordance with claim 5.

9. In a method of stripping paints, varnishes or lacquers, comprising applying a stripping composition to an object to be stripped, the improvement wherein the stripping composition is in accordance with claim 6.

10. In a method of stripping paints, varnishes or lacquers, comprising applying a stripping composition to an object to be stripped, the improvement wherein the stripping composition is in accordance with claim 2.

11. In a method of stripping paints, varnishes or lacquers, comprising applying a stripping composition to an object to be stripped, the improvement wherein the stripping composition is in accordance with claim 3.

12. In a method of stripping paints, varnishes or lacquers, comprising applying a stripping composition to an object to be stripped, the improvement wherein the stripping composition is in accordance with claim 4.

* * * * *